United States Patent [19]

Vukovich et al.

[11] Patent Number: 5,577,980
[45] Date of Patent: Nov. 26, 1996

[54] SHIFT FLARE CONTROL

[75] Inventors: William J. Vukovich, Ypsilanti; Melissa M. Koenig, Ann Arbor, both of Mich.

[73] Assignee: General Motors Corporation, Detroit, Mich.

[21] Appl. No.: 497,689

[22] Filed: Jun. 30, 1995

[51] Int. Cl.⁶ .................................................. F16H 61/06
[52] U.S. Cl. ..................... 477/144; 477/148; 477/156; 477/904
[58] Field of Search ..................... 477/115, 144, 477/145, 146, 156, 158, 79, 80, 148, 904

[56] References Cited

U.S. PATENT DOCUMENTS

| | | | |
|---|---|---|---|
| 5,119,697 | 6/1992 | Vukovich et al. | 74/867 |
| 5,129,286 | 7/1992 | Nitz et al. | 74/858 |
| 5,134,904 | 8/1992 | Minagawa | 477/904 |
| 5,343,782 | 9/1994 | Jamzodeh | 477/156 |
| 5,411,451 | 5/1995 | Ando et al. | 477/146 |

Primary Examiner—Charles A. Marmor
Assistant Examiner—Sherry Lynn Estremsky
Attorney, Agent, or Firm—Vincent A. Cichosz

[57] ABSTRACT

Flare control is provided for downshifts in a computer controlled automatic transmission by providing an adaptive pressure term which is adjusted in response to detected flare conditions. During a downshift, engine acceleration is monitored and flare is detected when negative engine acceleration remains below a predetermined level for a predetermined duration. The level of engine acceleration indicative of flare changes with vehicle speed.

4 Claims, 4 Drawing Sheets

SHIFT FLARE CONTROL

BACKGROUND

This invention is related to automotive powertrain systems including computer control of various automatic transmission functions. More specifically, the invention is concerned with control of speed flare during downshifts in an automatic transmission.

In a motor vehicle multi-ratio automatic transmission, it is often desirable to effect shifting from one ratio to another ratio without the use of free-wheeling devices such as one way clutches. This requires a coordinated timing control of both off-going and on-coming fluid operated friction elements in order to achieve a desired amount of overlap as the transmitted torque is shifted from the off-going friction element to the on-coming friction element. Typically, the off-going fluid pressure is released through an orifice while the fluid pressure is supplied to the on-coming friction element through a pressure control device such as an accumulator or servo. On-coming friction element engagement rate is controlled by controlling the fluid flow into the accumulator or servo. Examples of such control include varying a restriction at the inlet of the servo such as by pulse width modulation of an electro-hydraulic valve, controlling the average flow rate through a two flow state valve by controlling the proportion of time each flow state is active, or through coordinated control of line pressure and selection of one of two flow states of a solenoid operated valve.

It may be desirable to further adjust the flow rate in the case where the on-coming friction element does not reach a torque capacity sufficient to prevent the transmission input from exceeding the synchronous speed of the on-coming friction element.

SUMMARY

Therefore, the present invention provides a method of flare control in a powertrain including a multi-ratio automatic during a downshift from a first ratio to a second ratio. The downshift includes the release of an off-going friction element associated with the first ratio and the engagement of an on-coming friction element associated with the second ratio. Fluid pressure to the off-going friction element is reduced to thereby allow the engine to increase the input speed toward a synchronous speed corresponding to the second friction element. Meanwhile, fluid pressure is increased to the on-coming fiction device at a predetermined rate to progressively engage the on-coming friction element. Engine acceleration is monitored to detect a condition of flare as may be indicated by varying levels of negative engine acceleration. Upon the detection of engine flare by predetermined negative engine acceleration conditions, an adaptive pressure term is incremented for use in subsequent downshifts.

DETAILED DESCRIPTION

Figure 1:
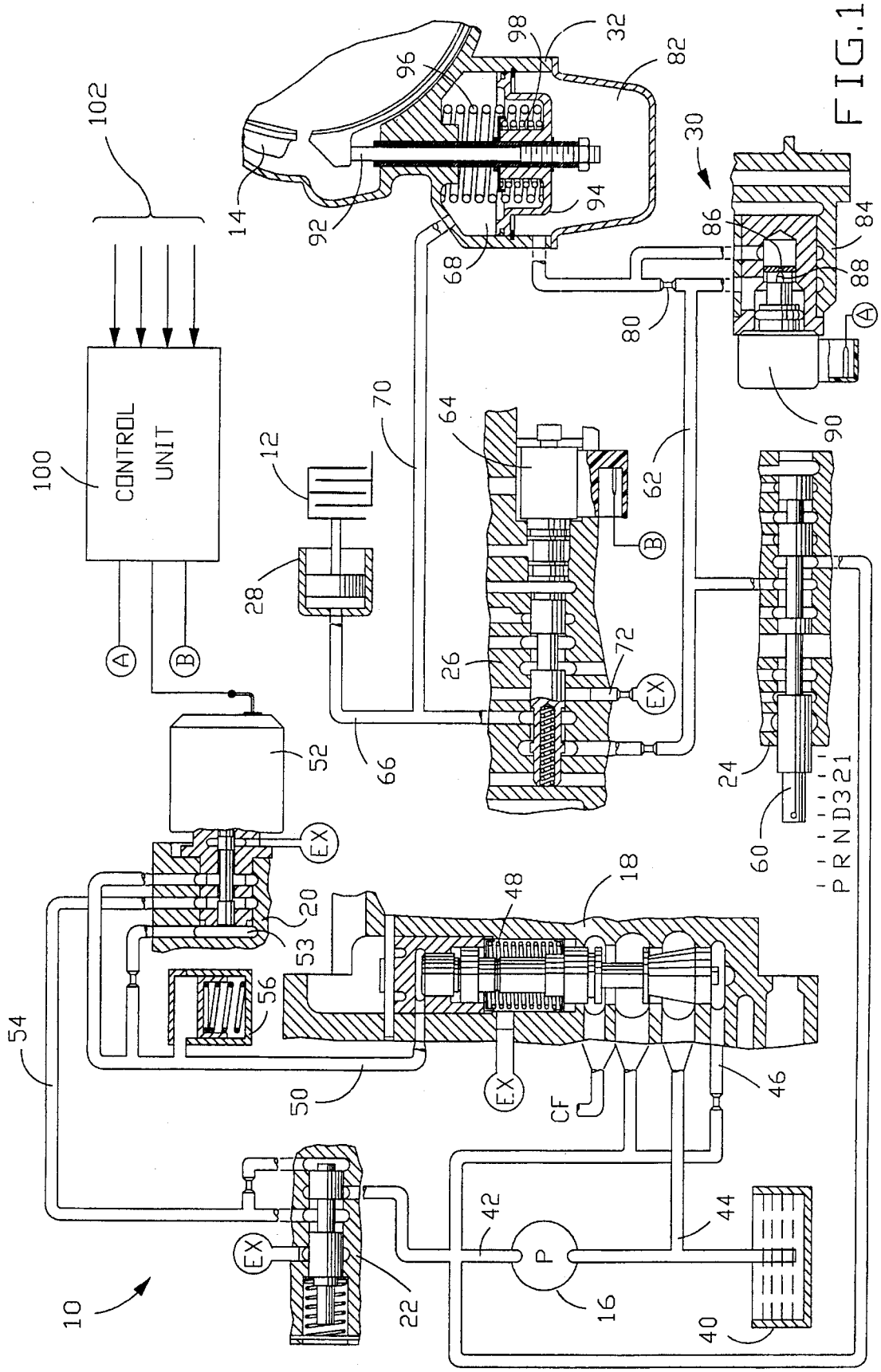
FIG. 1 illustration of a preferred computer controlled automatic transmission arrangement for implementing the flare control of the present invention.

Referring to FIG. 1, the reference numeral 10 generally designates an array of hydraulic transmission control elements for regulating the engagement and disengagement of friction clutch 12 and band brake 14 ("friction elements") to effect shifting between a pair of forward transmission speed ratios. In a typical application, a 1:1 or direct ratio (3rd) is provided with engagement of the clutch 12, and an underdrive ratio (2nd) is provided with engagement of the band brake 14. Thus, a 3-2 downshift is accomplished through concurrent disengagement of clutch 12 and engagement of band brake 14.

The illustrated hydraulic elements include a positive displacement mechanically driven hydraulic pump 16, a pressure regulator valve 18, a force motor controlled line pressure bias valve 20 and a limit valve 22, an operator manipulated manual valve 24, a solenoid controlled 2-3 shift valve 26, a clutch apply servo 28, a fluid restriction circuit 30 and a band apply servo 32. The pump 16 receives hydraulic fluid from at low pressure from the fluid reservoir 40, and supplies line pressure fluid to the transmission control elements via output line 42. Pressure regulator valve 18 is connected to the pump output line 42 and serves to regulate the line pressure and torque converter feed pressure (CF) by returning a controlled portion of the line pressure to reservoir 40 via line 44.

The pressure regulator valve 18 is biased at one end by orificed line pressure in line 46 and at the other end by the combination of a spring 48 and a controlled bias pressure in line 50. The controlled bias pressure is supplied by the line pressure bias valve 20 which develops pressure in relation to the current supplied to electric force motor 52, force motor 52 being hydraulically balanced by the pressure in bias chamber 53. Line pressure is supplied as an input to bias valve 20 via line 54 and the limit valve 22. An accumulator 56 connected to the bias pressure line 50 serves to stabilize the bias pressure.

With the above-described valving arrangement, it will be seen that the line pressure of the transmission is electrically regulated by force motor 52. In the event of an interruption of electrical power to the force motor 52, the bias pressure in line 50 assumes a maximum value, thereby forcing maximum line pressure.

The friction element 12 and band brake 14 are activated by conventional fluid servos 28 and 32, respectively. The servos 28 and 32, in turn, are connected to a fluid supply system comprising the manual valve 24, the 2-3 shift valve 26, and the fluid restriction circuit 30. The manual valve 24 develops a supply pressure D32 for the second and third forward speed ranges of the transmission in response to the driver positioning of the range select lever 60. The D32 pressure, in turn, is supplied via line 62 to the shift valve 26 and fluid restriction circuit 30 for application to the servos 28 and 32.

The shift valve 26 is spring-biased against a controlled bias pressure developed by the solenoid 64, the valve 26 being illustrated in its active state. In the illustrated state, the shift valve 26 supplies D32 supply pressure to the clutch servo 28 via line 66 and to a release chamber 68 of band brake servo 32 via line 70. In the deactivated state, the lines 66 and 70 are exhausted via the exhaust port 72.

The fluid restriction circuit 30 comprises a first orifice 80 connecting the D32 supply pressure line 62 to an apply chamber 82 of band break servo 32, and a solenoid operated valve 84 which is selectively activated to connect a second orifice in parallel with the first orifice 80, the second orifice being defined by the valve seat 86. The valve 84 includes a pintle armature 88 spring-biased into engagement with the seat 86, and a solenoid 90 which when electrically activated lifts the pintle armature 88 off the seat 86 to connect the seat orifice in parallel with the first orifice 80. Thus, the supply pressure fluid is supplied to the servo inlet chamber 82 via orifice 80 alone when the solenoid 90 is deactivated, and via the parallel combination of orifices 80 and 86 when the solenoid 90 is activated.

The servo 32 includes a post 92 fastened to a diaphragm 94 which is axially displaceable within the servo housing. A pair of springs 96 and 98 reacting against the housing of servo 32 urges the diaphragm 94 and hence the post 92 downward, as viewed in FIG. 1, to release the band brake 14. The spring forces may be aided by fluid pressure in release chamber 68 or opposed by fluid pressure in apply chamber 82.

Reference numeral 100 designates a computer based control unit which develops suitable electrical control signals for the force motor 52 and the solenoids 64 and 90 in response to a variety of vehicle and powertrain parameters, represented by the input lines 102. Such inputs generally include engine speed Ne, transmission input (turbine) speed Nt, transmission output speed No, vehicle speed Nv and throttle position TPS. The line pressure control of force motor 52 is essentially continuous during operation of the transmission, ensuring that the developed pressure is sufficient to prevent clutch slippage during steady state operation, and providing shift quality control during shifting. The control of solenoids 64 and 90, on the other hand, pertain strictly to shifting and are discrete or on-off in nature.

When a 3-2 downshift is required, the control unit 100 determines the required state of the valve solenoid 90, commands the appropriate line pressure signal to force motor 52, and deactivates the shift valve solenoid 64 to vent the fluid in clutch servo 28 and band brake servo release chamber 68. The combination of the line (D32) pressure and the effective orifice size of fluid restriction circuit 30 determines the fluid flow rate into servo apply chamber 82, which in turn determines the stroke time of the servo post 92. Alternatively, the control unit determines a delay time for activating the valve 84 and deactivates the shift valve 64 to vent the fluid in clutch servo 28 and band brake servo release chamber 68. The combination of the line pressure D32 and the effective orifice size of fluid restriction circuit 30 determines the flow rate into servo apply chamber 82, which in turn determines the stroke time of the servo post 92. Both of these techniques are detailed in U.S. Pat. Nos. 5,062,321 and 5,119,697, respectively, both of which are assigned to the assignee of the present invention.

Figure 2:
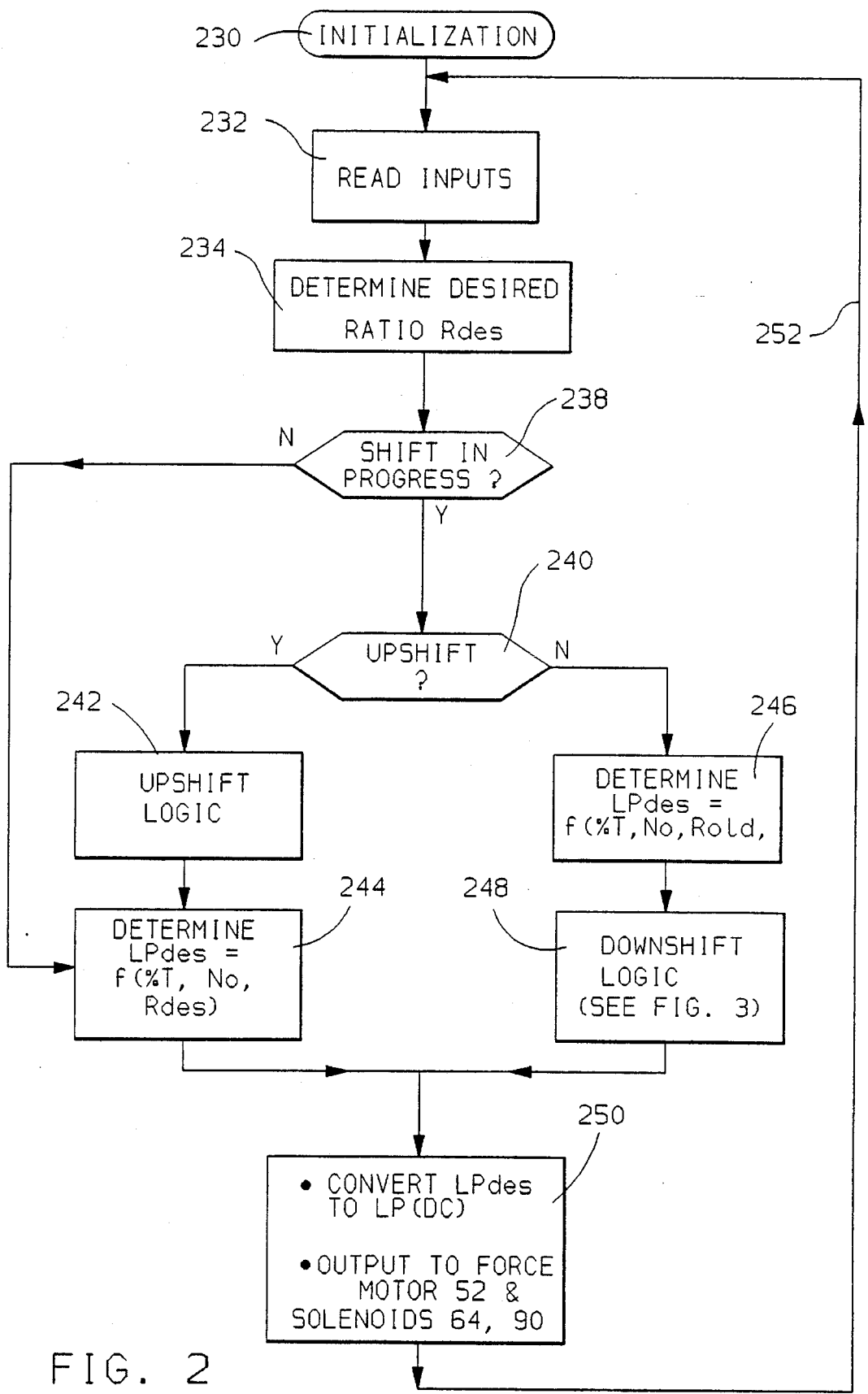
FIGS. 2–3 illustrate various flow diagrams representing computer instruction sets executed by a control unit as illustrated in FIG. 1 for carrying out the flare control of the present invention.
Figure 3A:
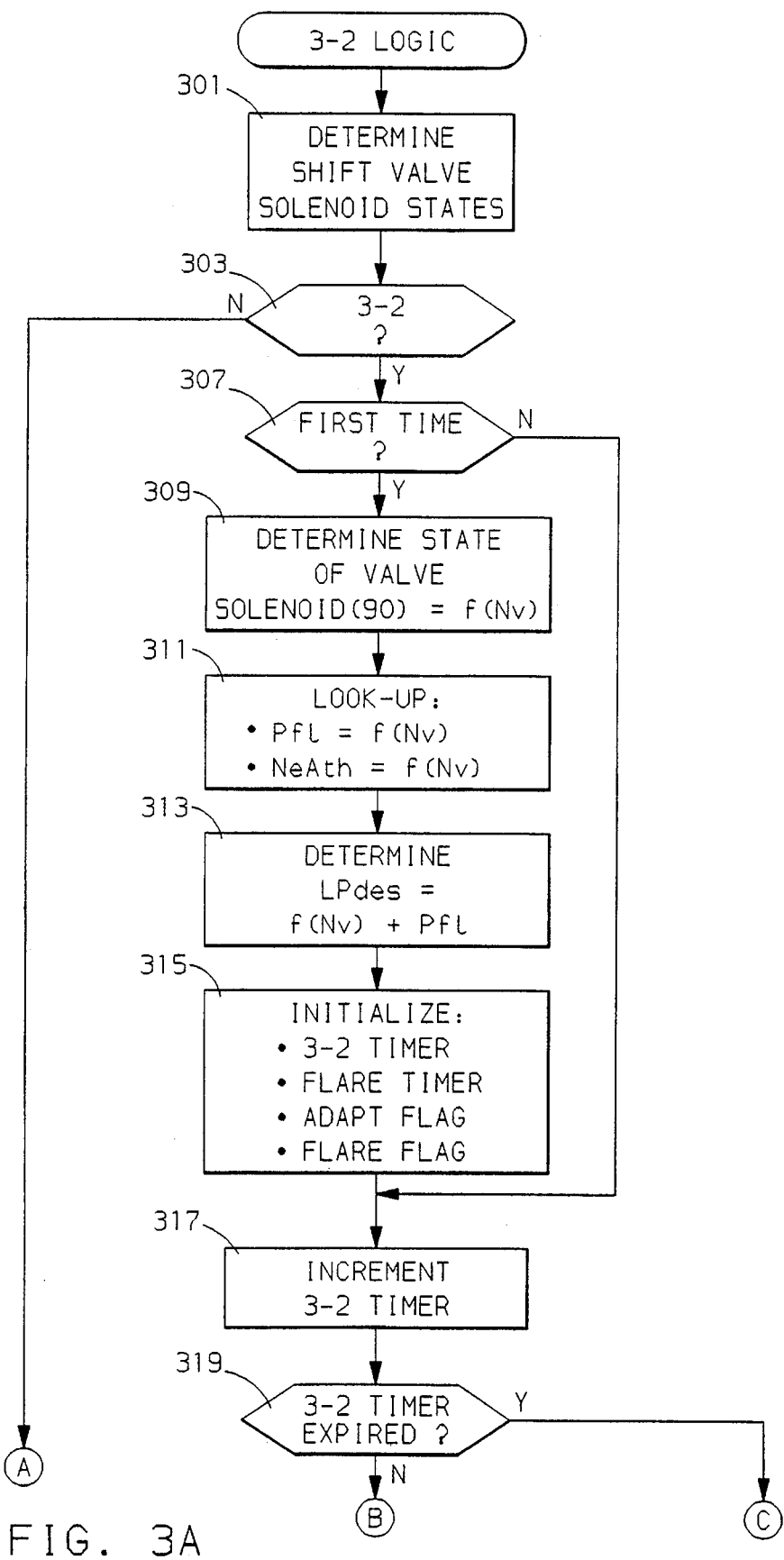
Figure 3B:
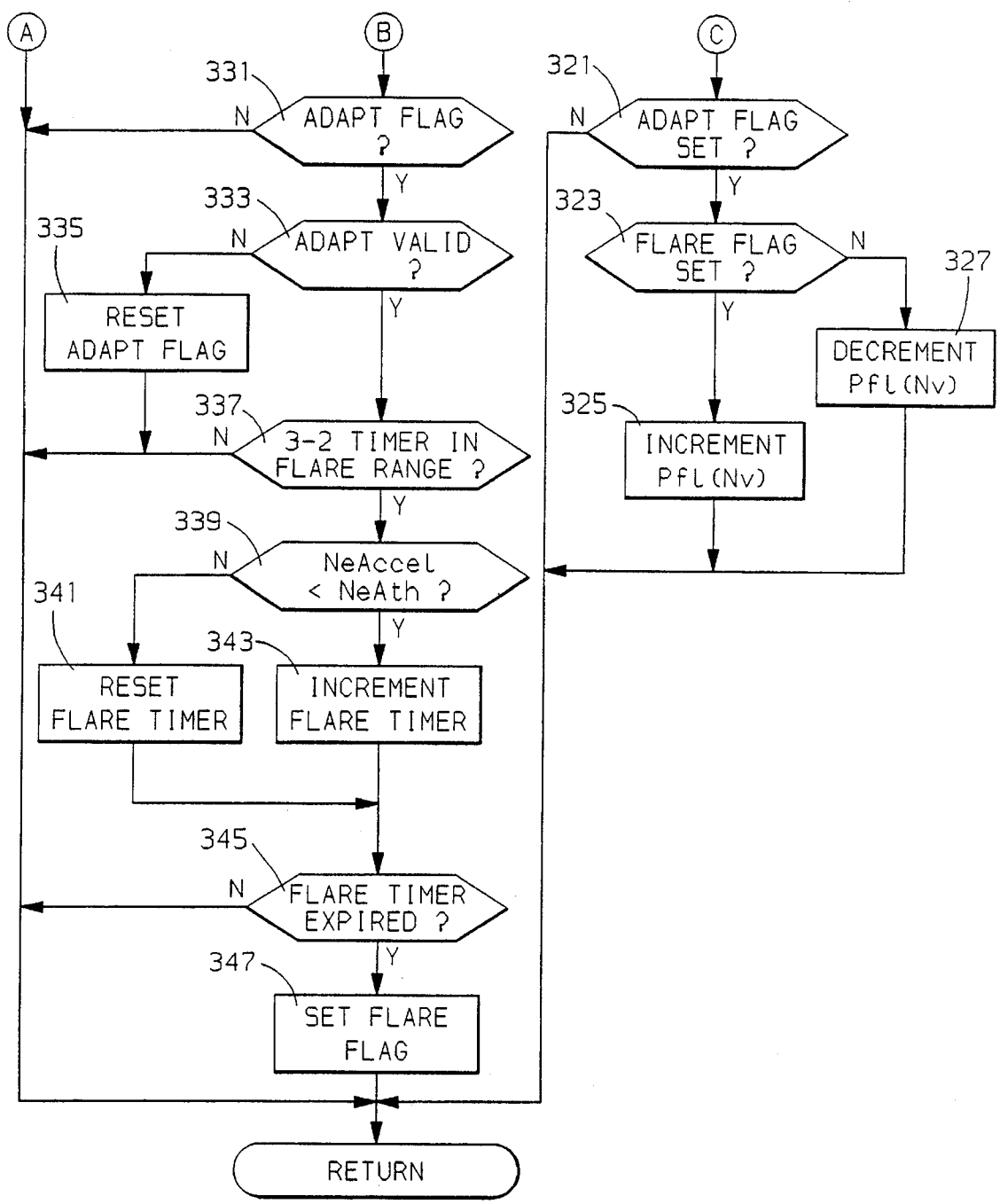

Flow diagrams, representative of computer program instructions executed by the control unit for carrying out the control of this invention with the described apparatus are depicted in FIGS. 2 and 3A–3B. The flow diagram of FIG. 2 represents a main or executive program which is periodically executed in the course of vehicle operation in carrying out the control of the present invention. The block 230 designates a series of program instructions executed at the initiation of each period of vehicle operation for setting various terms and timer values to initial conditions. Thereafter, blocks 232–234 are executed to read the various inputs referenced in FIG. 1 and to determine the desired ratio Rdes. The desired ratio Rdes may be determined in a conventional manner as a predefined function of engine throttle position and output vehicle speed Nv.

Block 238 next determines if a shift is currently active such as through comparing an actual ratio to the desired ratio, shift flags, or unexpired shift timers, etc. If the transmission is operating in steady sate, block 244 is executed to determine the desired line pressure LPdes. In this case, the desired line pressure LPdes is determined as a function of throttle position (%T) and output speed No, and also is adjusted based on the desired ratio Rdes.

If an upshift is required as determined by blocks 238 and 240, the blocks 242 and 244 are executed to perform suitable upshift logic in addition to determining the desired line pressure LPdes as described above. If a downshift is required, as determined by blocks 238 and 240, blocks 246 and 248 are executed to determine the desired line pressure LPdes and to perform the appropriate downshift logic. Normally, the desired line pressure is determined as a function of throttle position, output speed, and the pre-shift or old ratio Rold, as indicated at block 246, but is modified by the downshift logic block 248 if the shift is a 3-2 downshift. As indicated at block 248, the downshift logic is set forth in further detail in the flow diagram of FIG. 3. In any event, block 250 is then executed to convert the desired line pressure LPdes to a solenoid duty cycle LP(DC), to output the duty cycle LP(DC) to force motor 52 and to output discrete solenoid states to the solenoids 64 and 90.

Referring now to the downshift logic flow diagram of FIG. 3, block 301 is first executed to determine the required states of the various shift valve solenoids. If the shift is a 3-2 downshift, as detected at block 303, the blocks 307–347 are executed to perform the functions of the present invention. If the downshift is not a 3-2 downshift, the routine is exited without further tasks being performed. Assuming that the downshift is a 3-2 downshift, certain functions are performed at the start of the shift as indicated by steps 309–315. If the 3-2 logic is being executed for the first time, step 307 causes execution of blocks 309–315. Block 309 first determines the state of valve solenoid 90 as a function of the vehicle speed as described for example in the previously mentioned U.S. Pat. No. 5,062,321. Block 311 next performs table look-ups including an adaptive flare pressure term Pfl and an engine acceleration limit NeAth for use at a further point in detecting flare conditions. Block 313 next determines the desired line pressure LPdes as a function of vehicle speed with the addition of the adaptive flare pressure Pfl. Thereafter at block 315, a variety of timers and flags are reset to initial values for shift timing and flare adapt functions. These blocks 309–315 are bypassed after the start of the shift, the valve solenoid 90, engine acceleration limit NeAth and desired line pressure LPdes remaining as set for the remainder of the current 3-2 shift.

Block 317 performs an increment of the 3-2 timer which is used to determine the end of the 3-2 shift and an intermediate period in which flare detection is performed. Block 319 next checks if the 3-2 timer indicates that the shift is complete. When the 3-2 timer reaches a predetermined value, it is deemed to have expired and continued 3-2 downshift logic will not be executed in the next control loop.

Assuming that the 3-2 shift is stall active, then blocks 331–347 are executed to perform various steps in the determination of an adaptive pressure adjustment in response to the presence or absence of flare. Block 331 first determines if the adapt flag has been reset from an initial value. A reset of the adapt flag during a 3-2 shift is indicative of failed entry criteria which failure will not allow any update of an adaptive pressure value Pfl. This being the case, if the adapt flag is not set, this and all future passes through the 3-2 logic in the current 3-2 shift will bypass the reaming steps 333–347. Assuming the current value of the adapt flag will allow the adaptive routine to continue, block 333 determines if the entry conditions are still valid, thereby allowing the adapt flag to retain its current state and allowing the adaptive routine to be executed. Where the conditions are not valid, the adapt flag is reset at block 335 and further adaptive routine steps are bypassed as explained. Some conditions which must be satisfied for the adaptive pressure term to be updated include predetermined transmission operating temperatures, closed loop engine control, throttle position and change within predetermined ranges. Other criteria which may impact the desirability of performing an adaptive adjustment, which may impact the determined necessity of performing such an update, or which may effect the stability of critical control parameters may be taken into consideration.

If it is determined that continuation with the adaptive routine is proper as explained with reference to blocks 331–335, block 337 is next executed whereat a determination is made as to whether the shift is at a point within a predetermined range where it is appropriate to look for a flare condition. If block 337 is not satisfied, then the routine is exited. If the shift is at a point where flare is likely to occur, then blocks 339–347 perform steps for detecting if such a flare occurs during the present shift.

Flare detection in the present invention is performed by determining if engine acceleration falls below a predetermined negative acceleration for a predetermined amount of time. Keeping in mind that during a downshift the engine accelerates the turbine to a higher synchronous speed, an overshoot of the turbine speed relative to the synchronous speed will ultimately result in the on-coming clutch to pull-down the turbine speed to the synchronous speed. The engine in turn will experience a reduction in speed and consequently the acceleration thereof will show up as a negative quantity. All negative engine accelerations, however, are not necessarily indicative of objectionable speed flare. For example, negative engine accelerations of limited magnitude and/or duration may not be objectionable. Additionally, the shift point in terms of vehicle speed at which such a shift occurs has been found to impact significantly whether particular levels of negative engine acceleration correspond to objectionable flare. Therefore, the preferred manner of determining the engine acceleration below which an adaptive pressure increase is appropriately made is by way of empirically determined acceleration thresholds corresponding to diverse vehicle speeds. Such acceleration thresholds are then stored in tables for access during the 3-2 shift.

Block 339 compares the present engine acceleration NeAccel with an acceleration threshold NeAth determined as described above and as illustrated in the initially executed block 311 as a function of vehicle speed. If NeAccel is below the threshold, then block 343 increments the flare timer, block 345 checks to see if the flare timer has exceeded a predetermined value and if so step 347 sets the flare flag thereby indicating a flare has been detected. In the event that NeAccel is not less than NeAth, the flare timer is reset and block 347 is bypassed by the negative response at block 345. Enough sequential passes through the 3-2 control loop wherein NeAccel<NeAth to allow the timer to expire are necessary to determine a flare condition.

Assuming that a flare condition has been detected and the flare flag has been set, upon expiration of the 3-2 timer indicating the finish of the present 3-2 shift as shown in block 319, the flare adapt pressure term Pfl is updated by steps 321–327. Firstly, step 321 checks the adapt flag and where not set causes bypassing of the reaming steps since, as discussed, conditions were such that the current 3-2 shift was not deemed appropriate for an accurate adaptive update. If the adapt flag is set and allows an update of the flare adapt term Pfl (Nv), step 323 executes to check the flare flag status. A set flare flag indicates a flare condition and the flare adapt term Pfl(Nv) is updated at block 325 by a predetermined increment. On the other hand, if the flare flag is not set as determined at block 323, a flare condition was not detected and the flare adapt term Pfl(Nv) is updated by a predetermined decrement. The flare adapt term Pfl(Nv) is of course limited by lower and upper values beyond which respective increments and decrements are not made. Additionally, as can be seen from the flow diagrams, the flare adapt term is updated in correspondence with the particular vehicle speed to which it is associated, thereby allowing adaptive updates to be tailored to the operation of the 3-2 shift as the shift may vary across the various vehicle speeds.

We claim:

1. A method for controlling flare in a vehicular drivetrain during a downshift from a first ratio to a second ratio, said drivetrain including an engine having an output member drivingly coupled to an input member of a multi-ratio transmission for providing an input speed thereto, said downshift including releasing a friction element associated with the first ratio and increasing an on-coming fluid pressure to engage a second friction element associated with the second ratio, the method comprising the steps of:

releasing the first friction element to thereby allow the engine to increase the input speed toward a synchronous speed corresponding to the second friction element;

increasing the on-coming fluid pressure at a predetermined rate to progressively engage the on-coming friction element;

monitoring acceleration of the engine to detect a negative acceleration indicative of a flare condition; and when a flare condition is indicated, incrementing the predetermined rate of on-coming fluid pressure increase for use in subsequent downshifts.

2. A method as claimed in claim 1 wherein said step of monitoring acceleration includes the steps of:

comparing acceleration of the engine to a predetermined negative acceleration reference;

when the acceleration of the engine remains below the predetermined negative acceleration reference for a predetermined duration, indicating a flare condition.

3. A method as claimed in claim 2 wherein the predetermined negative acceleration reference is determined as a function of vehicle speed.

4. A method for controlling flare in a vehicular drivetrain during a downshift from a first ratio to a second ratio, said drivetrain including an engine having an output member drivingly coupled to an input member of a multi-ratio transmission for providing an input speed thereto, said downshift including releasing a friction element associated with the first ratio and increasing an on-coming fluid pressure to engage a second friction element associated with the second ratio, the method comprising the steps of:

releasing the first friction element to thereby allow the engine to increase the input speed toward a synchronous speed corresponding to the second friction element;

increasing the on-coming fluid pressure at a predetermined rate to progressively engage the on-coming friction element;

providing a predetermined negative acceleration reference as a function of vehicle speed;

when the accelerations of the engine remain below the predetermined negative acceleration reference for a predetermined duration, incrementing the predetermined rate of on-coming fluid pressure increase for use in subsequent downshifts.

* * * * *